(12) United States Patent
Piel et al.

(10) Patent No.: US 8,380,414 B2
(45) Date of Patent: Feb. 19, 2013

(54) BRAKE FOR A MOTOR VEHICLE

(75) Inventors: Jean-Marc Piel, Livry Gargan (FR); Christophe Leboube, Chevry Cossigny (FR); Nicolas Marlhe, Pelussin (FR)

(73) Assignee: Bosch Corporation, Stuttgart (DE)

( * ) Notice: Subject to any disclaimer, the term of this patent is extended or adjusted under 35 U.S.C. 154(b) by 536 days.

(21) Appl. No.: 12/644,263

(22) Filed: Dec. 22, 2009

(65) Prior Publication Data
US 2010/0161193 A1    Jun. 24, 2010

(30) Foreign Application Priority Data

Dec. 22, 2008   (FR) ..................................... 08 07420

(51) Int. Cl.
*B60T 7/12*   (2006.01)
(52) U.S. Cl. .............. 701/78; 701/22; 701/70; 701/101; 180/65.21; 303/3
(58) Field of Classification Search .................... 701/22, 701/70, 71, 78, 83, 81, 101, 103; 180/65.21; 303/3
See application file for complete search history.

(56) References Cited

U.S. PATENT DOCUMENTS
2008/0284242 A1* 11/2008 Ganzel ....................... 303/114.1

FOREIGN PATENT DOCUMENTS
EP    1078833 A2    2/2001
GB    2449984 A    12/2008

OTHER PUBLICATIONS
FR0807420 Search Report.

* cited by examiner

*Primary Examiner* — Gertrude Arthur Jeanglaude
(74) *Attorney, Agent, or Firm* — Michael Best & Friedrich LLP

(57) ABSTRACT

A system for simulating brake feel for a vehicle braking installation comprising a hydraulic braking system (7, 8) and an electric braking system (9). This system comprises a first chamber (20) containing a force transmitting fluid (21) and in which there slides a hydraulic piston (22) under the control of a manual braking operating member (1), the first chamber (20) communicating with a second, secondary simulation chamber (4) via a simulation valve (3), the degree of opening of which allows a force to be simulated at the brake pedal.

9 Claims, 3 Drawing Sheets

BRAKE FOR A MOTOR VEHICLE

BACKGROUND OF THE INVENTION

The invention relates to a system that simulates the braking feel at the brake pedal. It applies more particularly to a vehicle fitted with a conventional braking system in which the brake pedal acts on the hydraulic braking circuit that brakes the wheels of the vehicle, and with an auxiliary energy braking system such as an electric braking system. It applies notably to hybrid vehicles such as vehicles with combined traction comprising an internal combustion engine and one or more electric motors.

In the state of the art, it is known practice to fit out vehicles using two braking systems operated by the same operating device (brake pedal), and acting on the wheels of the vehicle using different sources of energy or power.

This is the case, for example, of hybrid vehicles with combined traction that have an internal combustion engine, for traction, and electric traction motors. In these vehicles, it is known practice to use the electric motors for braking, by operating them as electric generators, braking then being had by recuperation of energy.

The vehicle therefore comprises an energy recuperation electric braking system but it generally also comprises a conventional hydraulic braking system because the braking force for the electric braking system is limited and becomes very low at low speed.

Figure 1:
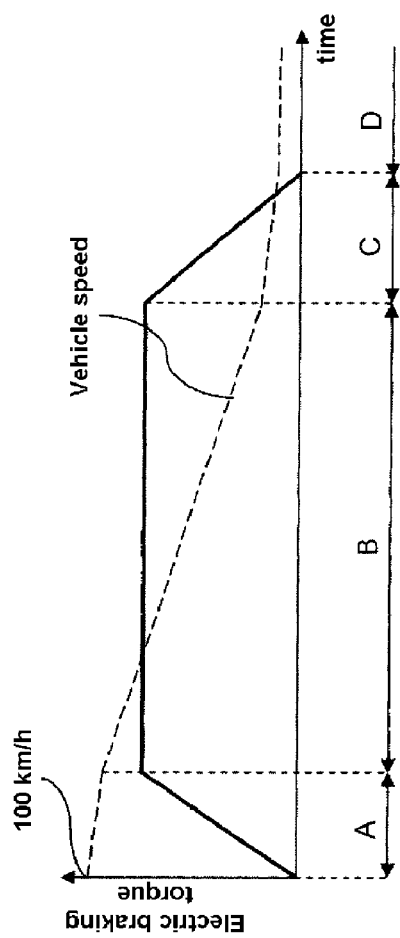

However, electric braking is not always entirely satisfactory. FIG. 1 schematically depicts, in continuous line, a braking curve (braking torque as a function of time) for one such electric braking system alone. In this same graph, a dotted line has been used to represent vehicle speed. In a first braking zone A, the braking increases gradually until it reaches its full effectiveness in a second braking zone B, then as the vehicle speed becomes low, in a third zone C, the braking torque decreases, becoming practically non-existent in a fourth zone D. A braking system such as this is imperfect because in zone A the braking does not reach full effectiveness quickly and because in zones C and D the braking decreases when the vehicle is at low speed. This kind of operation is depicted, in FIG. 1, by the curve in dotted line.

To remedy this disadvantage with recuperative electric braking, it is necessary to provide a hydraulic braking system which provides supplemental braking in zones A, C and D.

Figure 2:
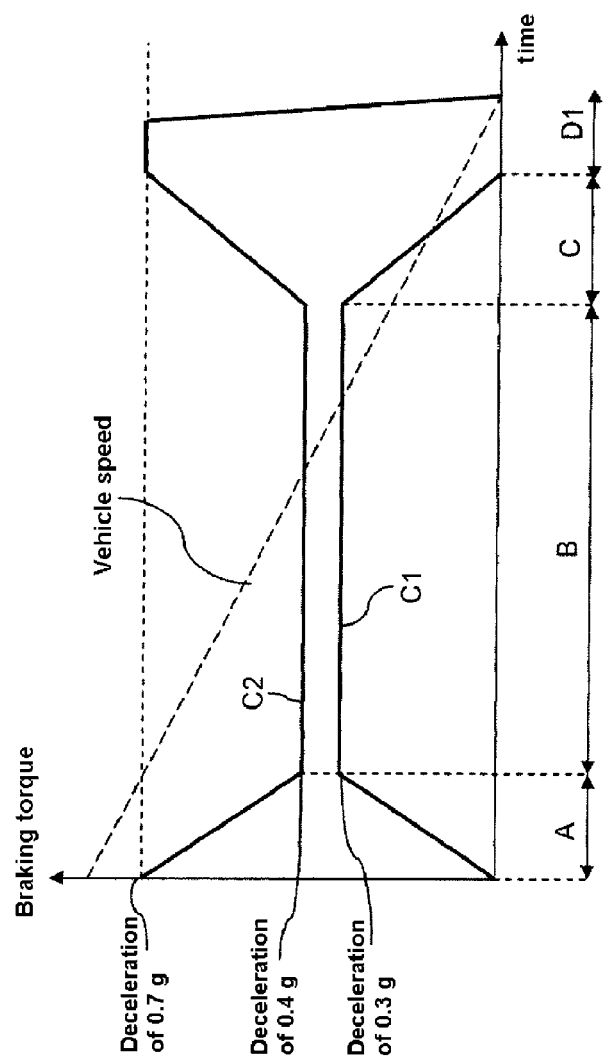

FIG. 2 shows curves of the operation of the electric braking system and of the hydraulic braking system.

Curve C1 is the curve of recuperative electric braking that corresponds to that of FIG. 1. If a vehicle deceleration of, for example, 0.7 g is desired, and the electric braking system is able to obtain a maximum deceleration of 0.3 g, then the braking curve applied by the hydraulic braking system will need to be the one schematically depicted by curve C2. In zone A, the hydraulic braking torque will as soon as possible allow a deceleration of 0.7 g and will then decrease until the electric braking torque reaches its maximum value and the equivalent deceleration due to this electric braking torque is 0.3 g. In this way, at any moment, the sum of the torques supplied by the electric and hydraulic braking systems provides a deceleration of 0.7 g. In zone B, the hydraulic braking system supplements the electric braking system in order also to obtain a deceleration of 0.7 g. Thereafter, in zone C, there is an increase in the braking torque of the hydraulic system in order once again to supplement the braking of the electric braking system and, in zone D1, to compensate for the practically non-existent electric braking torque.

Moreover, leaving aside the response times of the recuperative electric braking system, this system may not respond the same way all the time because the load on the recuperative circuit may vary. This is particularly the case when the recuperative circuit essentially comprises the vehicle batteries because in this case the load can vary according to the state of the batteries.

In such systems, a control circuit (for example a computer) has to manage the operations of the braking systems. This computer is called into service for each braking action.

However, the invention also applies to any other braking systems and in particular to braking systems in which there is a conventional hydraulic braking system and an auxiliary energy braking system.

In general, the invention can therefore be applied to a vehicle braking installation comprising an auxiliary energy service braking system and a muscle-powered braking system of the conventional type used for emergency braking.

A manually operated member such as a brake pedal actuates the service braking system or, should the latter fail or prove insufficient, the emergency braking.

Advantageously, the conventional braking system comprises a master cylinder fitted with at least one primary piston and is operated by the manual operating member (the brake pedal).

Furthermore, at least one safety valve allows the master cylinder to be isolated from the wheel brakes when the service braking system is operating normally. By contrast, when the braking force provided by the auxiliary energy braking system (the electrical braking system) is insufficient or when this braking system is defective, this safety valve allows the master cylinder to be coupled to at least one wheel brake.

In such systems, in order for the driver to have a feeling of braking when the external energy braking system is in operation, a braking feel simulator is provided in order to resist the forward movement of the manual operating member (the brake pedal), under auxiliary energy-powered service braking, with a reactive resistance force that reflects how braking is progressing.

This simulator commonly comprises a simulator piston sliding in a chamber. This piston is urged on one side (directly or indirectly) by the manual operating member and on another side by a means of applying a force which simulates the braking force.

When the auxiliary energy braking system is in operation, the master cylinder is therefore isolated from the wheel brakes and the liquid contained in the master cylinder is unable to flow back to these brakes. Thanks to the feel simulator, the manual operating member receives a force which resists the actuation of the manual operating member and simulates the braking force. In theory, this simulation system makes it possible to create a law governing the variation in the force to be applied to the manual operating member as a function of the travel. This gives the driver a feel similar to the feel he would obtain if the liquid pressure in the wheel brakes were the direct result of the pressure from the master cylinder and of the muscle power applied to the brake pedal.

In known simulation systems, the law governing the variation in the force to be applied to the manual operating member is determined chiefly by an elastic return means, generally formed by a spring, and the law cannot be modified simply and quickly, and this is a disadvantage. In addition, this elastic return means may have characteristics that vary over time or according to the type of vehicle.

SUMMARY OF THE INVENTION

It is an object of the invention to solve these disadvantages.

The invention therefore relates to a system for simulating brake feel for a vehicle braking installation comprising a hydraulic braking system operated by the muscle power of the driver, and an auxiliary energy braking system. A first chamber contains an incompressible fluid (typically brake fluid) that transmits force. In this first chamber there slides a hydraulic piston under the control of a manual braking operating member, and a piston that operates the hydraulic braking system. This first chamber communicates on command with a second, secondary simulation chamber, via a simulation valve the degree of opening of which enables a force to be simulated at the brake pedal.

According to one advantageous embodiment of the invention, a braking instruction detector is connected to a central control unit that operates the simulation valve as a function of the braking instruction detected by the detector and of the braking to be performed by the hydraulic braking system.

According to one preferred embodiment of the invention, there is a blocking valve that blocks the operation of said muscle-powered hydraulic braking circuit. This blocking valve is commanded into the blocking state by the central control unit when the simulation system is actuated.

Advantageously, the central control unit effects digital control of the simulation valve according to a degree of modulation corresponding to the braking operation of the auxiliary braking system.

According to an alternative form of embodiment of the system of the invention, the central control unit effects analog control of the simulation valve according to a degree of opening of the simulation valve which corresponds to the auxiliary braking system braking operation.

According to one advantageous embodiment of the invention, said first chamber contains a piston for operating the muscle-powered hydraulic braking system. The force transmission fluid is situated in said first chamber between the hydraulic braking system operating piston and the hydraulic piston which is operated by the manual braking operating member. In addition, said operating piston carries an operating rod for operating a brake booster and/or a master cylinder.

According to a preferred embodiment of the invention, the second, secondary simulation chamber comprises a space which communicates via the simulation valve with the first chamber and which contains the same type of fluid as this first chamber, a piston pushed by an elastic device closing said second chamber without offering any significant resistance to the displacement of the fluid from the first chamber to the second chamber.

Advantageously, a detector that detects the movement of the manual braking operating member supplies a movement detection signal which is transmitted to the central control unit, which controls the opening and/or closing of the simulation valve.

Advantageously, the auxiliary energy braking system is an electrical braking system with recuperation of energy.

The invention also relates to an application of the braking feel simulation system as defined hereinabove to a hybrid traction vehicle with electric motors and an internal combustion engine. The hydraulic braking circuit for each wheel of the vehicle which is intended to brake this vehicle is then fitted with a blocking valve that blocks said hydraulic circuit.

BRIEF DESCRIPTION OF THE INVENTION

Figure 3:
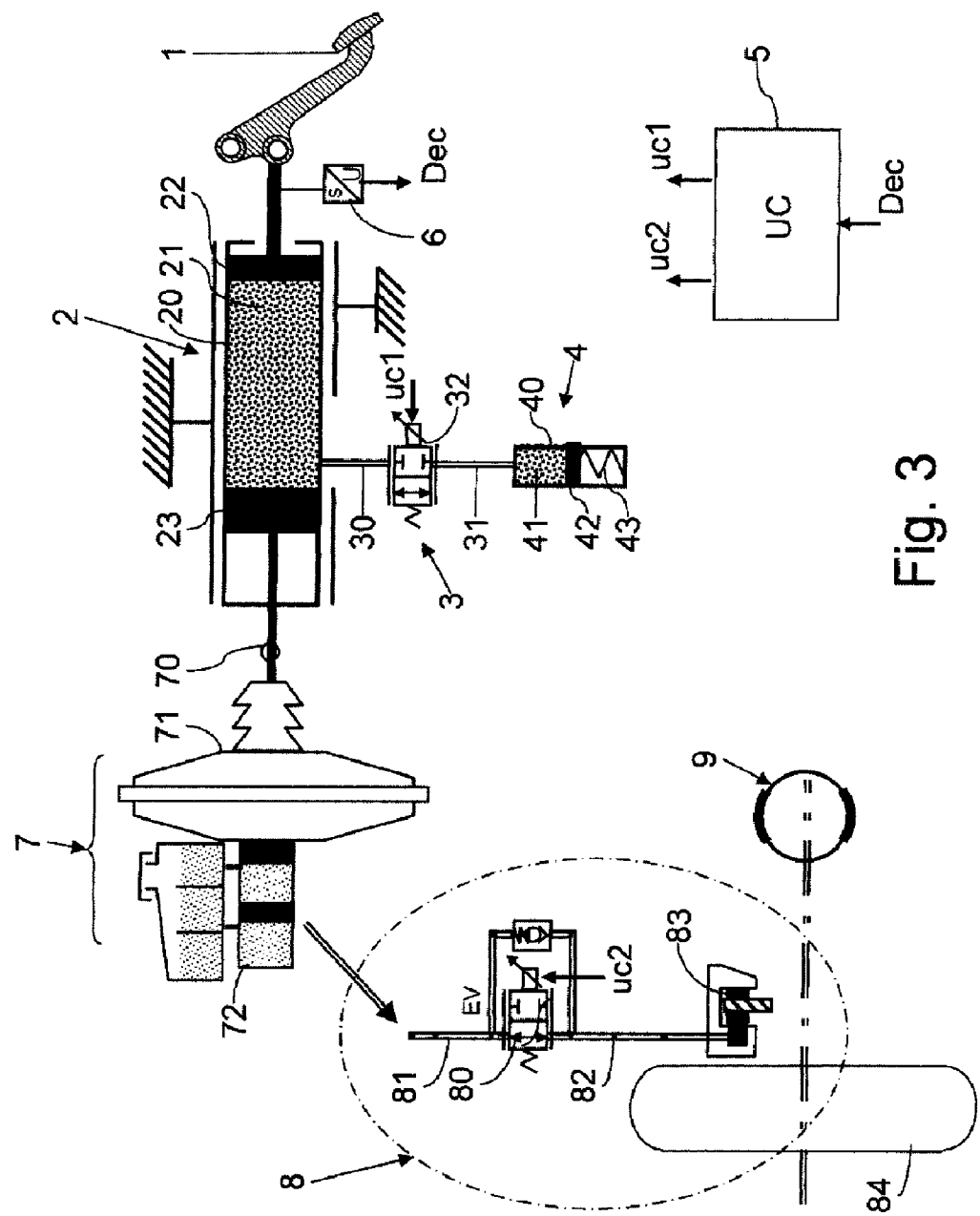
Figure 4:
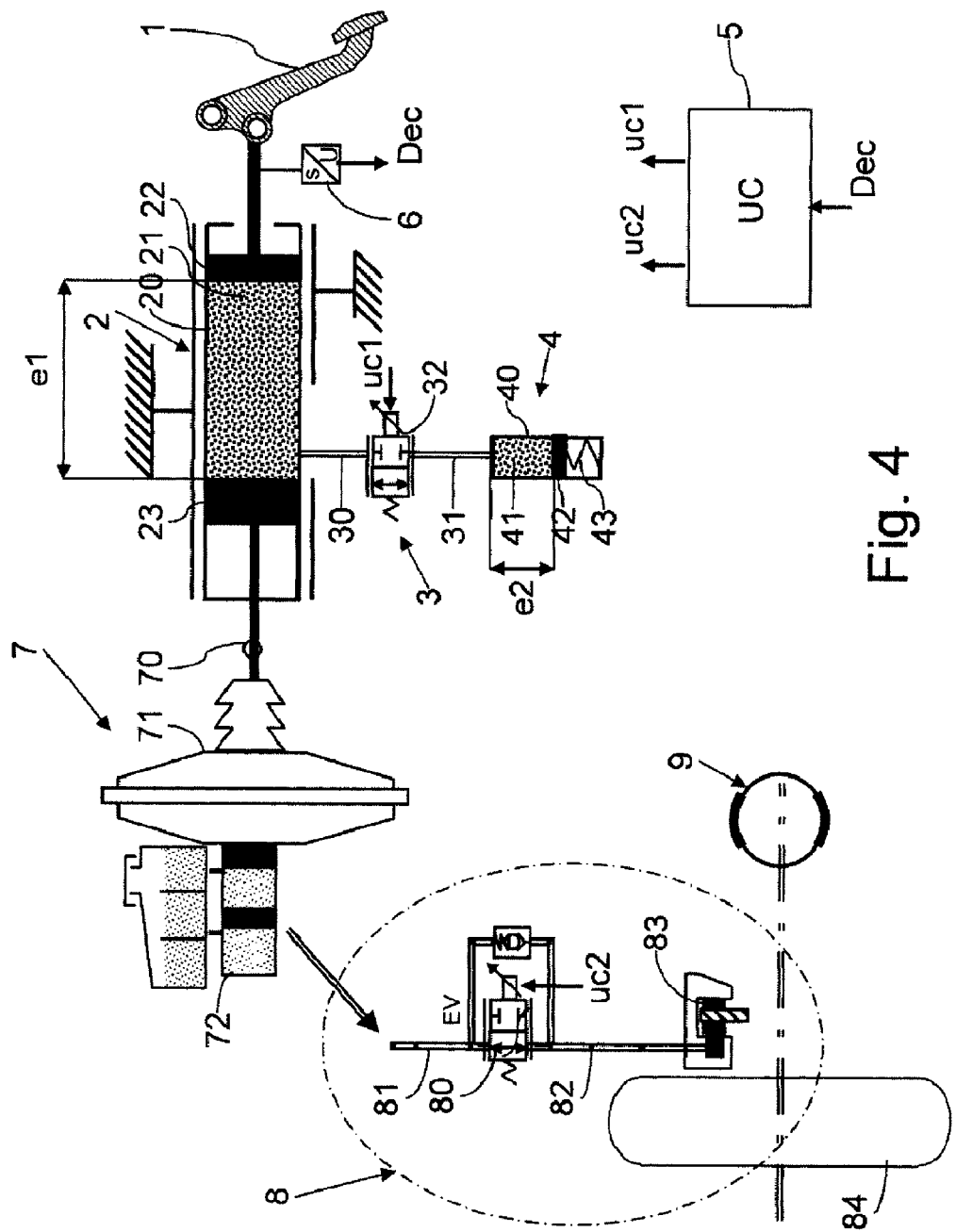

The various objects and features of the invention will become more clearly apparent from the description which will follow and from the attached figures which depict:

FIGS. 1 and 2: operating curves already described hereinabove;

FIG. 3: an exemplary embodiment of the braking simulation system according to the invention;

FIG. 4: one example of the operation of the system of FIG. 3.

DETAILED DESCRIPTION

One exemplary embodiment of the system of the invention will therefore be described with reference to FIG. 3.

By way of example, this system will be described in the context of an application to a hybrid traction vehicle having an internal combustion engine for traction and one or more electric traction motors. It is known practice, in such a vehicle, to use the electric motors as electric current generators when there is a desire to brake the vehicle. The electrical energy supplied is used to recharge the batteries of the vehicle. The vehicle is thus braked by recuperating energy to recharge the batteries. However, the braking force may prove insufficient in the case of emergency braking, and is also not sufficient at low speed and, in any event, is dependent on the level of charge of the batteries. This is why a vehicle such as this therefore generally also has a conventional braking system such as a hydraulic braking system the braking force of which is at least partially the result of the force applied by the driver to the brake pedal. The braking system normally used is the recuperative electrical braking system then, if need be, the hydraulic braking system is brought into service. These braking systems are managed by a central control unit which decides how and when to use the hydraulic braking system. These systems are known in the prior art and need not therefore be described.

When the electric braking system is used it is necessary to provide a simulation system which offers a force resisting the movement of the brake pedal when the driver depresses this brake pedal. This has the effect of simulating the braking force for the benefit of the driver. Furthermore, the position of the brake pedal is no longer necessarily connected with the position of the pistons of the brake master cylinder.

According to the invention, the system of FIG. 3 provides a first chamber 20, typically a cylindrical one, in which there slides a first piston 22 which is actuated by the brake pedal 1. A second piston 23 also slides in the chamber 20 and carries an operating rod 70 to operate a brake booster 71 and, thereafter, drive the pistons of a hydraulic braking system 7.

A storage device comprising a second chamber 4 is connected to the first chamber 20 by two pipes 30 and 31 and by a simulation valve 3. Between the two pistons 20 and 23 there is a fluid which can flow to the storage device depending on the state of openness of the simulation valve.

Furthermore, blocking valves, such as the valve 80, can be used to block the operation of the hydraulic braking circuit 7-8. By way of example, the system of the invention provides a blocking valve on the hydraulic circuit for each wheel, preventing a braking pressure from being transmitted to each wheel.

FIG. 3 depicts just one wheel 84 and its braking device 83. A blocking valve 80 is provided on the pipes 81 and that connect the braking device 83 to the brake master cylinder 72.

Because the vehicle is a hybrid vehicle, a motor 9 has been depicted that can be used to turn the wheel 84.

The way in which the system works will now be described.

When the driver depresses the brake pedal 1, the detector Dec detects a braking instruction, for example the movement of the brake pedal or the force applied to this pedal, and transmits a detection signal to a central control unit 5. The latter commands the electric motor 9 to operate as an electric generator, in the way known in the art.

At the same time, the central control unit 5 transmits a simulation signal uc1 to the simulation valve 32 to command it to open. The characteristics of this signal are a function of the braking instruction and of the capacity to brake using recuperative braking. The openness of the valve 32 is therefore a function of the signal uc1. At the pedal, the driver feels a customary reaction corresponding to an instruction to brake.

Furthermore, the central control unit transmits a blocking signal uc2 to the blocking valve 80. The effectiveness of the hydraulic braking circuit is then limited, or even blocked. The pistons of the master cylinder 72 can move only to take over, if necessary, from the recuperative braking. Likewise, operation of the brake booster is blocked. The operating rod 70 can therefore not move and prevents the piston 23 from moving.

As a result, when the driver depresses the brake pedal, the piston 22 tends to move to the left (in FIGS. 3 and 4). Because the movement of the piston 23 is blocked, the piston 22 drives the fluid 21 contained in the chamber 20 towards the chamber 40. As was seen earlier, the openness of the valve 32 is a function of the characteristic of the signal uc1 and the valve 32 may therefore limit the passage of fluid 21 according to the movement of the brake pedal.

The signal uc1 supplied by the central control unit 5 may be a digital (or pulsed) signal, the pulse repetition rate then being a function of the movement of the brake pedal and of the pedal feel that is to be fed back to the driver (which can be applied by software parameterizing).

Advantageously, use is made of pulse width modulation (the English-language abbreviation PWM for this is widely recognized) valves.

For example, in order to simulate a low braking force (greater instantaneous movement of the brake pedal), the duty factor of the signal uc1 will be high in order to obtain a significant degree of opening of the valve 32.

Conversely, in order to simulate a strong braking force (lesser instantaneous movement of the brake pedal), the duty factor of the signal uc1 will be low in order to obtain a small degree of opening of the valve 32.

According to an alternative form of embodiment, the signal uc1 supplied by the central control unit 5 is an analog signal. The amplitude of this signal determines the greater or lesser degree of opening of the valve 32 in order to offer greater or lesser resistance to the movement of the brake pedal.

As may be seen in FIG. 4, the depressing of the brake pedal has caused the piston 22 to move and the distance e1 between the piston 22 and the piston 23 has been reduced. Some of the fluid 21 (dependent on the degree of openness of the valve 32) has been displaced into the space 41 of the chamber 40. The length e2 and, therefore, the volume of this space 41, has therefore increased.

In FIGS. 3 and 4, it can be seen that the device 4 advantageously comprises a retaining member 43 preventing the piston 42 from moving around freely in the chamber 40, the device 4 forming a hydraulic accumulator. This retaining member plays no (or very little) part in compressing the fluid contained in the chamber 40 and has merely a retaining role. In any event, it has no part to play in the pedal feel, which will be determined by the way in which the controllable valve is operated.

It can therefore be seen that the system of the invention makes it possible to simulate a braking force at the brake pedal even though the braking force applied to the wheels of the vehicle is supplied by a source of energy (electric braking) that does not result from the force needed to depress the brake pedal.

Furthermore, when the central control unit determines that the recuperative electric braking system is insufficient to meet the driver's demand for braking, the central control unit may decide to bring the hydraulic braking system 7-8 into operation.

Provision may then be made for the central control unit 5 to command partial or full closure of the simulation valve 32. What happens is that the simulation system can be taken out of operation in the absence of electric braking because the driver perceives a normal braking force from the fact that the hydraulic braking system has come into operation.

A signal uc2 is supplied to the blocking valves such as the valve 80. The wheel brake hydraulic circuits are unblocked.

Because of the closing of the simulation valve 32, the piston 23 moves to the left (in FIGS. 3 and 4) under the action of the movement of the piston 22 and the displacement of the fluid 21. The operating rod 70 operates the brake booster 71 and therefore causes the pistons of the master cylinder 72 to move. The hydraulic braking devices 83, typically disk brakes, receive pressurized brake fluid.

In the foregoing description, in order to simplify matters, it has been considered that when electrical braking is active, the hydraulic braking system is blocked, and vice versa. However, without departing from the scope of the invention, it is also possible to anticipate limited operation of the hydraulic braking system to compensate for any insufficiency in braking force provided by the electric braking system.

The invention claimed is:

1. System for simulating brake feel for a vehicle braking installation comprising a hydraulic braking system (7, 8) operated by muscle power of the driver, and an auxiliary braking system, characterized in that the system comprises a first chamber (20) containing a force transmitting fluid (21) and in which there slides a hydraulic piston (22) driven by a manual braking operating member (1) and a piston (23) for operating the hydraulic braking system (7, 8), said first chamber (20) communicating on command with a second, secondary simulation chamber (4) via a simulation valve (3), a degree of opening of which allows a force to be simulated at a brake pedal, and in that the system comprises a blocking valve (80) blocking operation of said hydraulic braking system (7, 8), this blocking valve being commanded into a blocking state by a central control unit (5) when the simulation system is actuated.

2. Braking feel simulation system according to claim 1, characterized in that the system comprises a braking instruction detector (6) connected to the central control unit (5) that operates the simulation valve (3) as a function of a braking instruction (Dec) detected by a detector (6) and of braking to be performed by the hydraulic braking system (7, 8).

3. Braking feel simulation system according to claim 2, characterized in that the central control unit (5) effects digital control of the simulation valve (3) according to a degree of modulation corresponding to a braking operation of an auxiliary braking system.

4. Braking feel simulation system according to claim 1, characterized in that said first chamber (20) contains a piston (23) for operating the hydraulic braking system (7), said force transmitting fluid (21) being situated in said chamber (20) between the hydraulic braking system operating piston (23) and the hydraulic piston (22) which is operated by the manual braking operating member (1), and in that said operating piston (23) carries an operating rod (70) for operating one of a brake booster (71) and a master cylinder (72).

5. Braking feel simulation system according to claim 4, characterized in that the second, secondary simulation chamber (4) comprises a space (40) which communicates via the simulation valve (3) with the first chamber (20) and which contains the same type of fluid as the first chamber (20), a piston (42) pushed by an elastic device (43) closing said second chamber (4) without offering any significant resistance to displacement of the fluid from the first chamber (20) to the second chamber (4).

6. Braking feel simulation system according to claim 5, characterized in that the system comprises a detector (6) that detects movement of the manual braking operating member (1) and supplies a movement detection signal (Dec) which is transmitted to the central control unit (5), which controls one opening and closing of the simulation valve (3).

7. Braking feel simulation system according to claim 1, characterized in that the auxiliary energy braking system (9) is an electrical braking system with recuperation of energy.

8. A method of applying a braking feel simulation system to a hybrid vehicle with electric traction motors and an internal combustion engine, the vehicle having a braking installation comprising a hydraulic braking system (7, 8) operated by muscle power of the driver, and an auxiliary braking system that is an electrical braking system with recuperation of energy, the braking feel simulation system comprising a first chamber (20) containing a force transmitting fluid (21) and in which there slides a hydraulic piston (22) driven by a manual braking operating member (1) and a piston (23) for operating the hydraulic braking system (7, 8), said first chamber (20) communicating on command with a second, secondary simulation chamber (4) via a simulation valve (3), a degree of opening of which allows a force to be simulated at a brake pedal, and the braking feel simulation system also comprising a blocking valve (80) blocking operation of said hydraulic braking system (7, 8), this blocking valve (80) being commanded into a blocking state by a central control unit (5) when the simulation system is actuated, the method comprising fitting a hydraulic braking circuit for each wheel used for braking the vehicle with a blocking valve (80) that blocks said hydraulic circuit.

9. A hybrid vehicle with electric traction motors and an internal combustion engine, the vehicle having wheels and a braking installation comprising a hydraulic braking system (7, 8) operated by muscle power of the driver, an auxiliary braking system that is an electrical braking system with recuperation of energy, and a braking feel simulation system comprising a first chamber (20) containing a force transmitting fluid (21) and in which there slides a hydraulic piston (22) driven by a manual braking operating member (1) and a piston (23) for operating the hydraulic braking system (7, 8), said first chamber (20) communicating on command with a second, secondary simulation chamber (4) via a simulation valve (3), a degree of opening of which allows a force to be simulated at a brake pedal, and the braking feel simulation system also comprising a blocking valve (80) blocking operation of said hydraulic braking system (7, 8), this blocking valve (80) being commanded into a blocking state by a central control unit (5) when the system is actuated, a hydraulic braking circuit for each wheel used for braking the vehicle including a blocking valve (80) that blocks said hydraulic circuit.

* * * * *